US 011671011 B2

United States Patent
Huang et al.

(10) Patent No.: US 11,671,011 B2
(45) Date of Patent: Jun. 6, 2023

(54) MODULAR HIGH STEP-DOWN DC/DC CONVERTER

(71) Applicant: The University of Texas at Austin, Austin, TX (US)

(72) Inventors: Qin Huang, Austin, TX (US); Qingyun Huang, Austin, TX (US)

(73) Assignee: BOARD OF REGENTS, THE UNIVERSITY OF TEXAS SYSTEM, Austin, TX (US)

( * ) Notice: Subject to any disclaimer, the term of this patent is extended or adjusted under 35 U.S.C. 154(b) by 299 days.

(21) Appl. No.: 17/049,286

(22) PCT Filed: May 8, 2019

(86) PCT No.: PCT/US2019/031357
§ 371 (c)(1),
(2) Date: Oct. 20, 2020

(87) PCT Pub. No.: WO2019/217577
PCT Pub. Date: Nov. 14, 2019

(65) Prior Publication Data
US 2021/0242776 A1    Aug. 5, 2021

Related U.S. Application Data

(60) Provisional application No. 62/669,203, filed on May 9, 2018.

(51) Int. Cl.
*H02M 3/158* (2006.01)
*H02M 1/00* (2006.01)
(Continued)

(52) U.S. Cl.
CPC ......... *H02M 3/158* (2013.01); *H02M 1/0048* (2021.05); *H02M 1/08* (2013.01); *H02M 3/07* (2013.01)

(58) Field of Classification Search
None
See application file for complete search history.

(56) References Cited

U.S. PATENT DOCUMENTS 8,736,243 B2 *   5/2014   Gizara ................. H02M 3/157
                                                              323/283
10,819,244 B1 *  10/2020  Shi ..................... H02M 3/33573
(Continued)

FOREIGN PATENT DOCUMENTS

| JP | 2006-262619 A | 9/2006 |
| JP | 2007-049809 A | 2/2007 |
| JP | 2008-099370 A | 4/2008 |

OTHER PUBLICATIONS

PCT International Search Report and Written Opinion for PCT/US2019/031357, dated Sep. 11, 2019.

*Primary Examiner* — Matthew V Nguyen
(74) *Attorney, Agent, or Firm* — Patterson + Sheridan, LLP

(57) ABSTRACT

Method and apparatus include a circuit having a duty cycle and interleaving modulation configured to realize high density and efficient energy transfer. The circuit may efficiently achieve higher step-down voltage ratios with fewer electrical components. For example, as few as seven electrical devices, such as switches and diodes, may be used to realize at least a four-to-one conversion ratio. The high density of the circuit is advantageous to meet shrinking space demands A modulator may interleave signals sent to the electrical components (e.g., switching devices via driver circuitry). The driver signals may include a duty cycle of $1/(n_c+1)$, where $n_c$ is $(n-1)/3$, and n is the number of devices.

20 Claims, 10 Drawing Sheets

(51) Int. Cl.
  *H02M 1/08*   (2006.01)
  *H02M 3/07*   (2006.01)

(56) References Cited

U.S. PATENT DOCUMENTS

| | | |
|---|---|---|
| 11,063,516 B1* | 7/2021 | Kim ........................ H02M 3/07 |
| 2009/0072800 A1 | 3/2009 | Ramadass et al. |
| 2015/0263612 A1 | 9/2015 | Wu et al. |
| 2016/0057825 A1* | 2/2016 | Hu ........................ H05B 45/325 |
| | | 315/201 |
| 2021/0111632 A1* | 4/2021 | Shi ........................ H02M 3/01 |
| 2022/0069705 A1* | 3/2022 | Kim ........................ H02M 1/08 |

\* cited by examiner

MODULAR HIGH STEP-DOWN DC/DC CONVERTER

CROSS-REFERENCE TO RELATED APPLICATIONS

This application for Patent is a national stage application under 35 U.S.C. 371 of PCT/US2019/031357, filed May 8, 2019, which claims priority to U.S. Application No. 62/669,203, filed May 9, 2018, which are both incorporated herein by reference in their entireties.

BACKGROUND

The present invention relates generally to electrical hardware, and more particularly, to power conversion circuitry.

A DC-to-DC converter is an electronic circuit or electromechanical power converter that converts a source of direct current (DC) from one voltage level to another. Power levels range from very low (small batteries) to very high (high-voltage power transmission). For example, datacenters, servers, and telecommunications systems require high step-down DC/DC conversions. Typical conversion architectures include step-downs from twelve volts to one volt, and forty-eight volts to one volt. Conventional DC-to-DC converters include Buck, switch tank, Fibonacci, and multistage capacitor resonant converters. Some such conventional converters fail to achieve high density and high step-down voltage ratios, while others require numerous switching and other costly components.

SUMMARY

According to a particular embodiment, an apparatus includes at least two switching components configured to perform a switching function and at least two conductivity arbitrating devices in electrical communication with the at least two switching components. Driver circuitry may be configured to deliver a plurality of driver signals to the at least two electrical components, wherein the plurality of driver signals include interleaved modulation and a duty cycle configured to step-down a direct current (DC) voltage.

In a particular example, a modulator may be configured to interleave a plurality of duty cycle signals delivered to the driver circuitry. The duty cycle may change as a function of a number of the switching components plus a number of the conductivity arbitrating devices. The modulator may be configured to generate a plurality of duty cycle signals having a duty cycle equal to $1/(nc+1)$, wherein nc is $(n-1)/3$, and n is a number of the switching components plus a number of the conductivity arbitrating devices.

According to an embodiment, the conductivity arbitrating devices include at least one of a diode and an additional switch. The switching components may include a metal-oxide-semiconductor field-effect transistor (MOSFET). An implementation may include inductor. The inductor may resonate with a capacitance.

In an implementation, the system may include a modular cell comprising an additional switching component and two additional conductivity arbitrating devices. A modulator may be configured to generate a plurality of duty cycle signals having a duty cycle equal to $1/(nc+1)$, wherein nc is a number of modular cells.

According to another particular embodiment, a method of manufacturing a circuit includes providing at least two switching components configured to perform a switching function and providing at least two conductivity arbitrating devices in electrical communication with the at least two switching components. Driver circuitry configured to deliver a plurality of driver signals to the at least two electrical components may be provided. The plurality of driver signals may include interleaved modulation and a duty cycle configured to step-down a direct current (DC) voltage.

In an example, the method may provide a modulator configured to interleave a plurality of duty cycle signals delivered to the driver circuitry. The duty cycle may change as a function of a number of the switching components plus a number of the conductivity arbitrating devices. The modulator may be configured to generate a plurality of duty cycle signals having a duty cycle equal to $1/(nc+1)$, wherein nc is $(n-1)/3$, and n is a number of the switching components plus a number of the conductivity arbitrating devices.

An embodiment of the method may include the conductivity arbitrating devices being at least one of a diode and an additional switch. The two switching components may include a metal-oxide-semiconductor field-effect transistor (MOSFET).

The method may include providing an inductor. The inductor may resonate with a capacitance. An embodiment may provide a modular cell comprising an additional switching component and two additional conductivity arbitrating devices. The modulator may be configured to generate a plurality of duty cycle signals having a duty cycle equal to $1/(nc+1)$, wherein nc is a number of modular cells.

DETAILED DESCRIPTION

A circuit may have a duty cycle and interleaving modulation configured to realize high density and efficient energy transfer. An embodiment may efficiently achieve higher step-down voltage ratios with fewer electrical components. For example, as few as seven electrical devices, such as switches and diodes, may be used to realize at least a four-to-one conversion ratio. The high density of the circuit is advantageous to meet shrinking space demands. A modulator may interleave signals sent to the electrical components (e.g., switching devices via driver circuitry). The driver signals may include a duty cycle of 1/(nc+1), where nc is (n−1)/3, and n is the number of devices. Put another way, the duty cycle may be 1/[(n−1)/3)+1]. Thus, the duty cycle changes as a function of n. As such, $V_{out}=\frac{1}{2}^{(n-1)/3}$ in a particular embodiment.

As explained herein, nc in the above duty cycle equation is an abbreviation for a number of modular cells. An illustrative circuit may include two switches and two diodes or additional switches, among other electrical components. The circuit may be modular (e.g., have modular cells comprising added electrical components added) to achieve greater conversion ratios and step-down voltages. Additional modular cells may include one switch, as well as two diodes or two additional switches, among other electrical components.

The driver signals may include a duty cycle of 1/(nc+1), where nc is the number of modular cells (equivalent to (n−1)/3, where n is the number of devices). In such an embodiment of modular cells, $V_{out}=\frac{1}{2}^{nc}(V_{in})$. This equation may be equivalent to $V_{out}=\frac{1}{2}^{(n-1)/3}$, where n is the number of switching components plus the number of diodes/additional switches. Inductors may be added to further increase efficiency.

Figure 1:
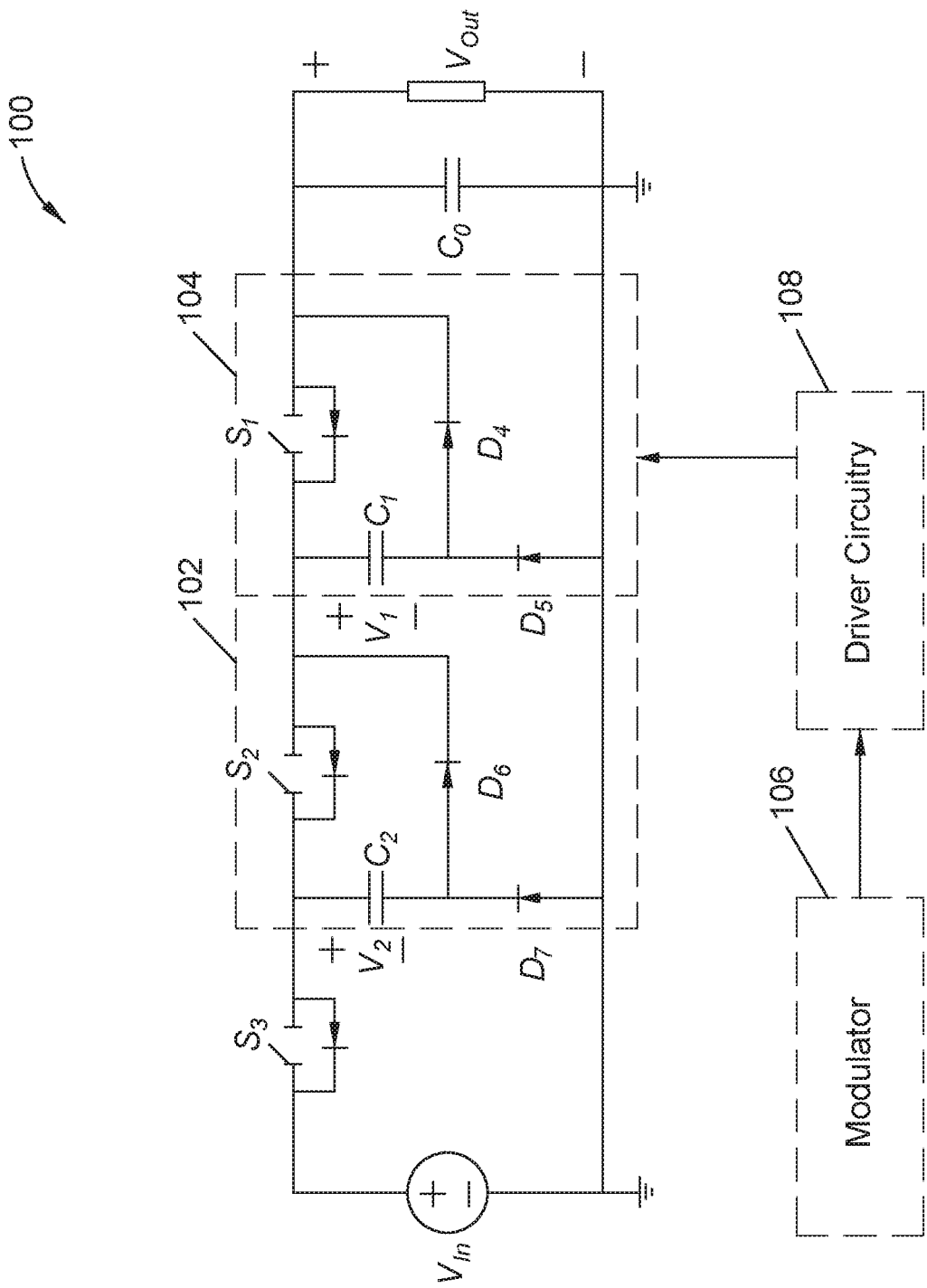
FIG. 1 is a circuit diagram of an embodiment of an apparatus configured to realize high density and efficient energy transfer using a particular duty cycle and interleaving modulation.

Turning more particularly to the Drawings, FIG. 1 is a circuit diagram of an embodiment of a system 100 configured to realize high density and efficient energy transfer using a particular duty cycle and interleaving modulation. As shown, the system 100 includes three switches $S_1$, $S_2$, $S_3$ and four diodes $D_4$, $D_5$, $D_6$, $D_7$, for a total of seven electrical devices. As shown, the switches may be metal-oxide-semiconductor field-effect transistors (MOSFETs). However, one skilled in the art will appreciate that numerous other components could be used to regulate current flow. The circuit diagram has an input voltage $V_{in}$, and an output voltage $V_{out}$, as well as associated capacitances $C_0$, $C_1$, $C_2$ and voltages $V_1$, $V_2$.

Despite including only seven electrical devices $S_1$, $S_2$, $S_3$, $D_4$, $D_5$, $D_6$, $D_7$, the system 100 realizes a four-to-one conversion ratio. The high density of the circuit is advantageous in devices where tight space considerations are present.

The circuit may be modular in that it includes one or more modular cells comprising added electrical components. Dashed boundary lines in FIG. 1 designate such modular cells 102, 104. As shown, the modular cell 102 includes one switch $S_2$ and two diodes $D_6$, $D_7$. The modular cell 104 includes switch $S_1$ and diodes $D_4$, $D_5$. Another embodiment of the system may include additional such modular cells to realize higher voltage step-down ratios.

A modulator 106 may interleave logic signals sent from driver circuitry 108 to the switches $S_1$, $S_2$, $S_3$. Illustrative logic signals received by the switches $S_1$, $S_2$, $S_3$ may include a constant duty cycle of 1/(nc+1), where nc is either (n−1)/3, or the number of modular cells, and n is the number of devices. Thus, the duty cycle changes as a function of the number of devices.

Figure 2:
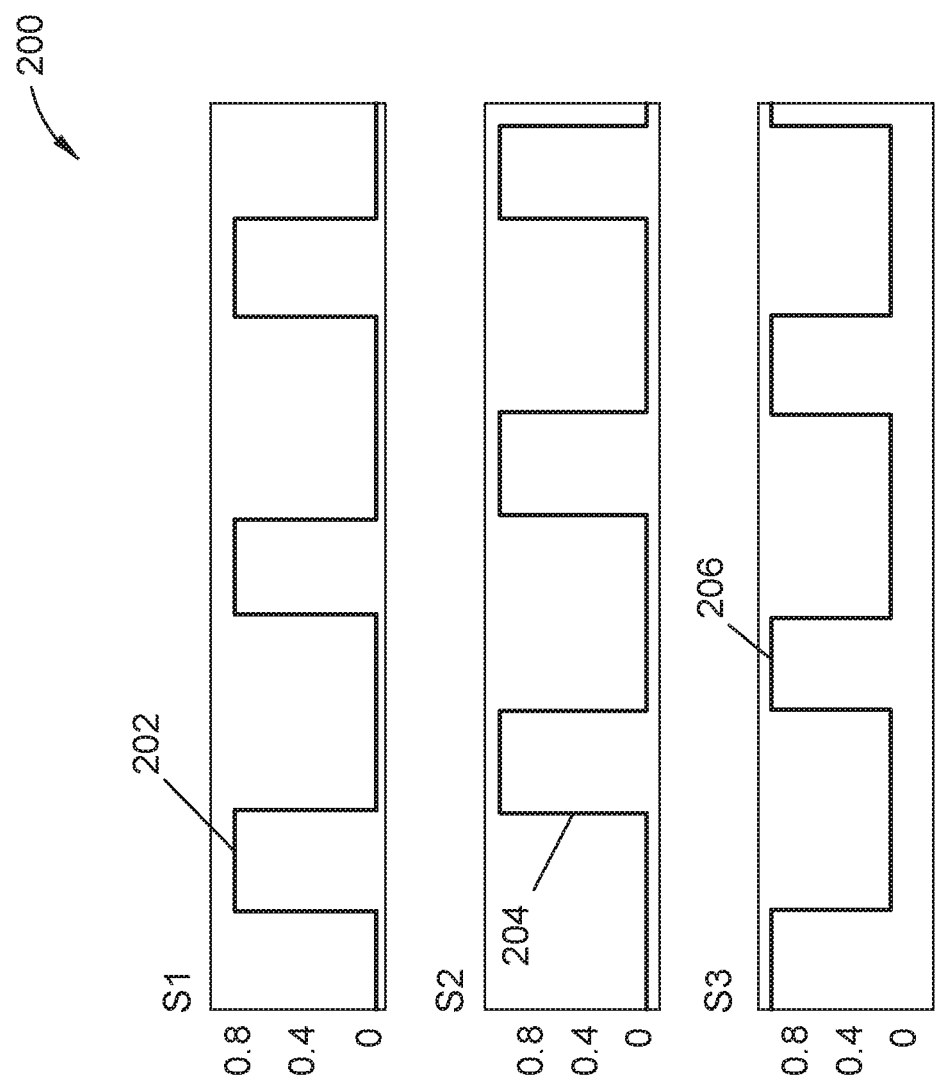
FIG. 2 shows illustrative duty cycles associated with the switches of the system of FIG. 1.

FIG. 2 shows illustrative duty cycles 200 associated with the switches $S_1$, $S_2$, $S_3$ of the system 100 of FIG. 1. As shown in FIG. 2, the duty cycle at each switch $S_1$, $S_2$, $S_3$ is about one third. That is, each switch $S_1$, $S_2$, $S_3$ operates one third of a cycle to exponentially decrease of the voltage $V_{out}$.

Moreover, the duty cycles are interleaved, or timed sequentially. As such, a waveform 202 of the duty cycle associated with $S_1$ ends around or at the same time as a waveform 204 of the duty cycle at $S_2$ begins. As that waveform 204 goes to zero, a waveform 206 of the duty cycle at $S_3$ begins, and so on in a complementary manner. The interleaving and duty cycle may result in the output voltage of the system equaling: $V_{out}=\frac{1}{2}^{(n-1)/3}(V_{in})$, or $V_{out}=\frac{1}{2}^{nc}(V_{in})$. With reference to FIG. 1, the voltage at $V_1$ may equal $V_{in}/2$ and $V_2$ may equal Vout, which equals $V_{in}/4$.

Figure 3:
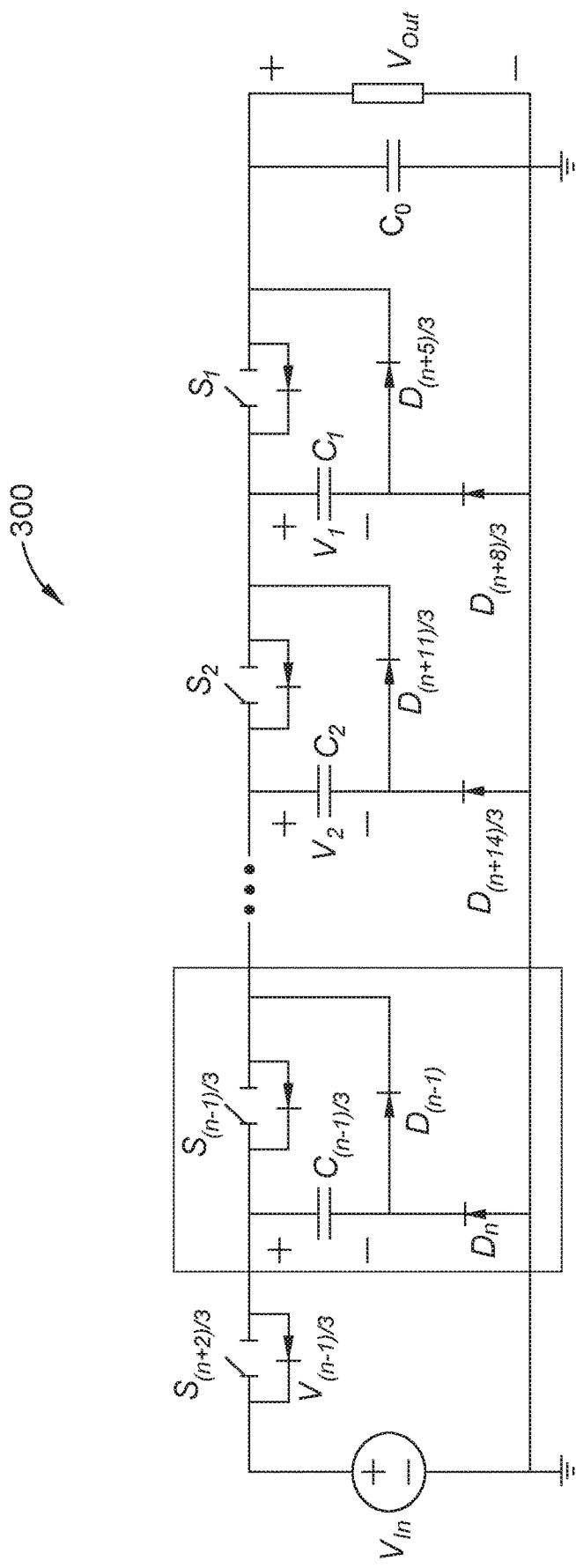
FIG. 3 is a circuit diagram of an embodiment of a system 300 that is similar to the system of FIG. 1, but that includes additional (e.g., three or more) modular cells.

FIG. 3 is a circuit diagram of an embodiment of a system 300 that is similar to the system 100 of FIG. 1, but that includes additional (e.g., three or more) modular cells. The system 100 has a constant duty cycle of 2/(n−1) and interleaving modulation. There may be n devices for a 1 to $2^{(n-1)/3}$ step-down conversion ratio. As such, for 7 devices, the $V_{out}/V_{in}$ ratio is 1/4. In contrast, the same number of devices with a conventional Fibonacci converter would only have a 1/3 ratio. More dramatically, an embodiment with 10 devices results in a ratio of 1/8, while the ratio of the conventional converter is 1/5. Exponentially, a 1/16 ratio is achieved with 13 devices, compared to 1/8 with the conventional converter.

Figure 4:
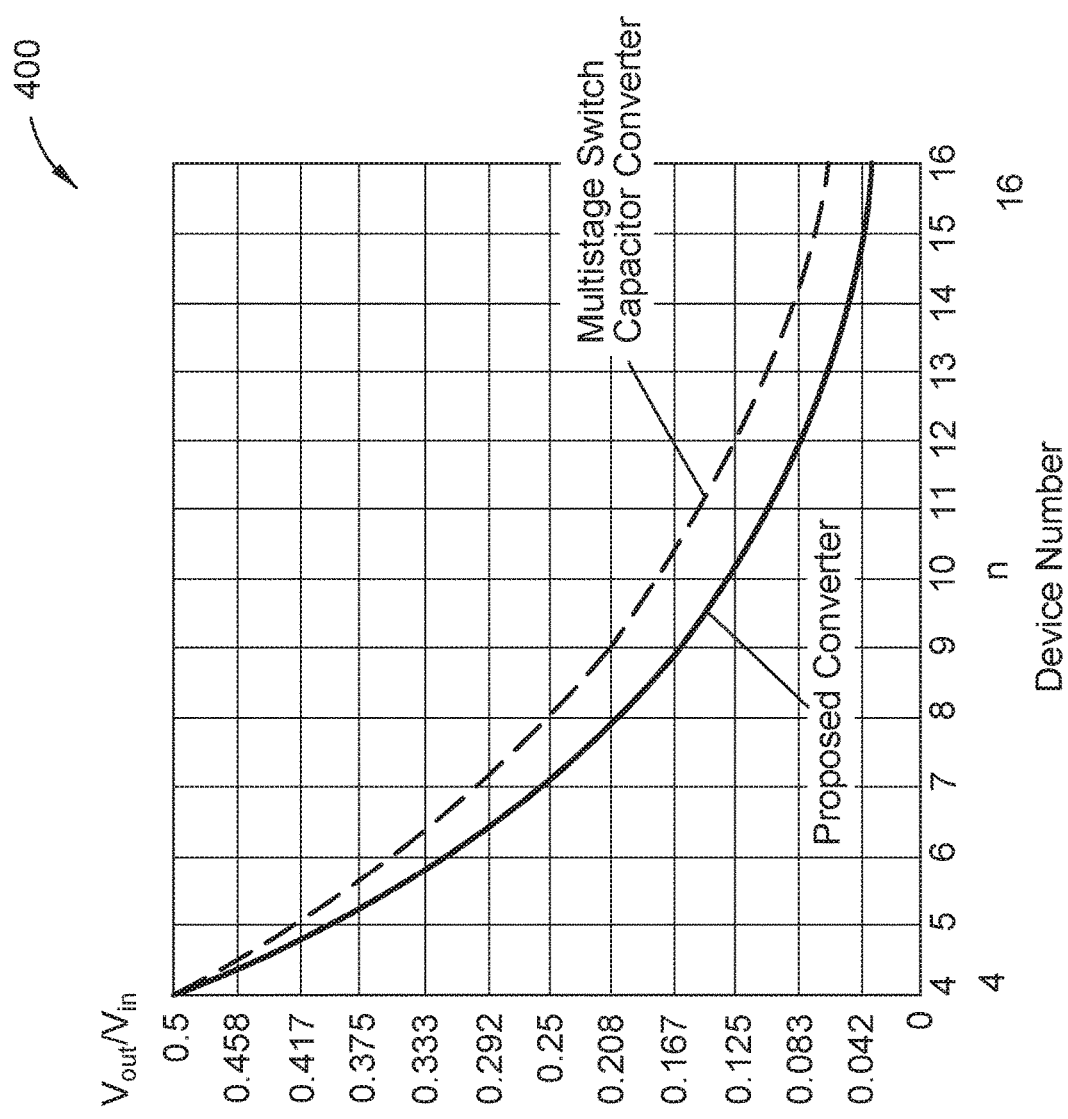
FIG. 4 is graph plotting a curve of a $V_{out}/V_{in}$ ratio over a number of devices included in an embodiment of the system, versus a second plotted curve associated with a conventional multistage switch capacitor converter.

FIG. 4 is graph 400 plotting a curve 402 of a $V_{out}/V_{in}$ ratio over a number of devices included in an embodiment of the system, versus a second plotted curve 404 associated with a conventional multistage switch capacitor converter. As evident in the graph 400, the embodiment of the system produces lower voltages than the conventional converter with the same number of devices.

Figure 5:
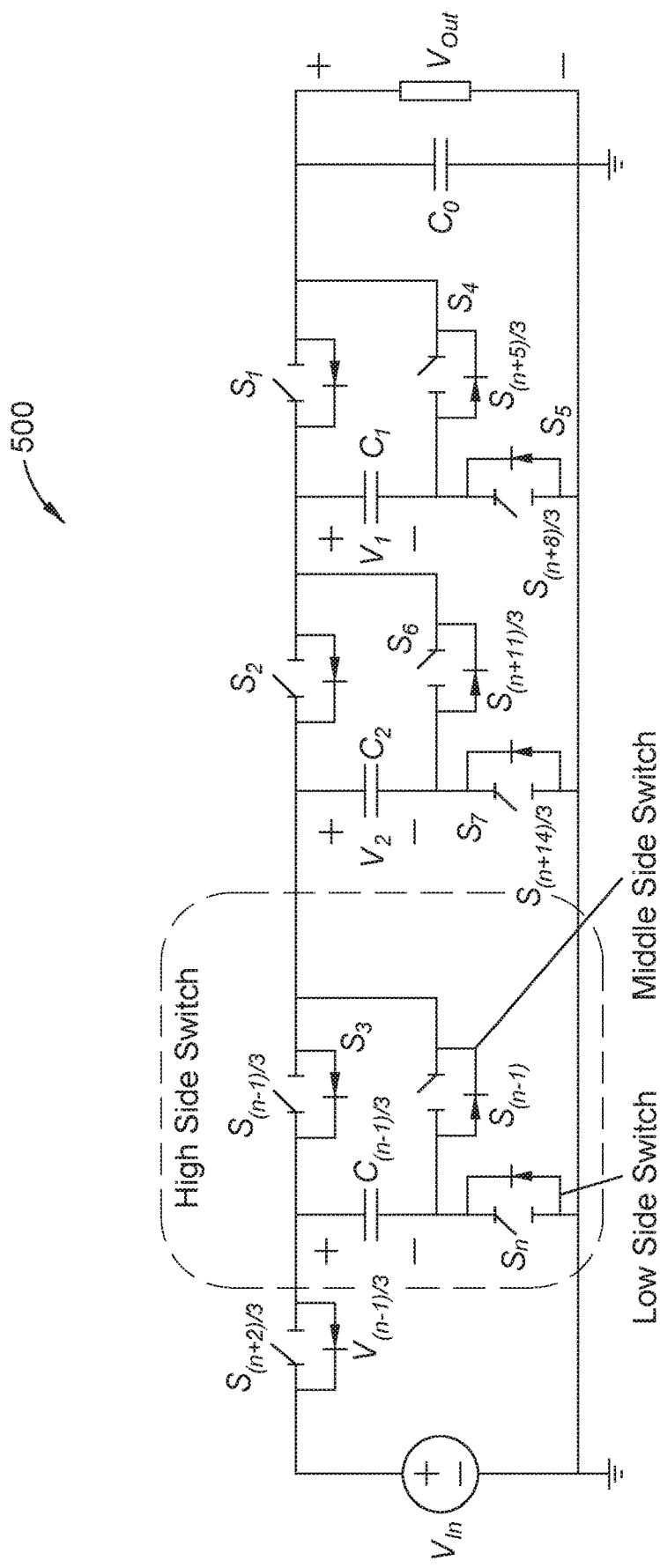
FIG. 5 is a circuit diagram of an embodiment of a system that is similar to the system of FIG. 3, but that switches out the diodes with MOSFETs.
Figure 6:
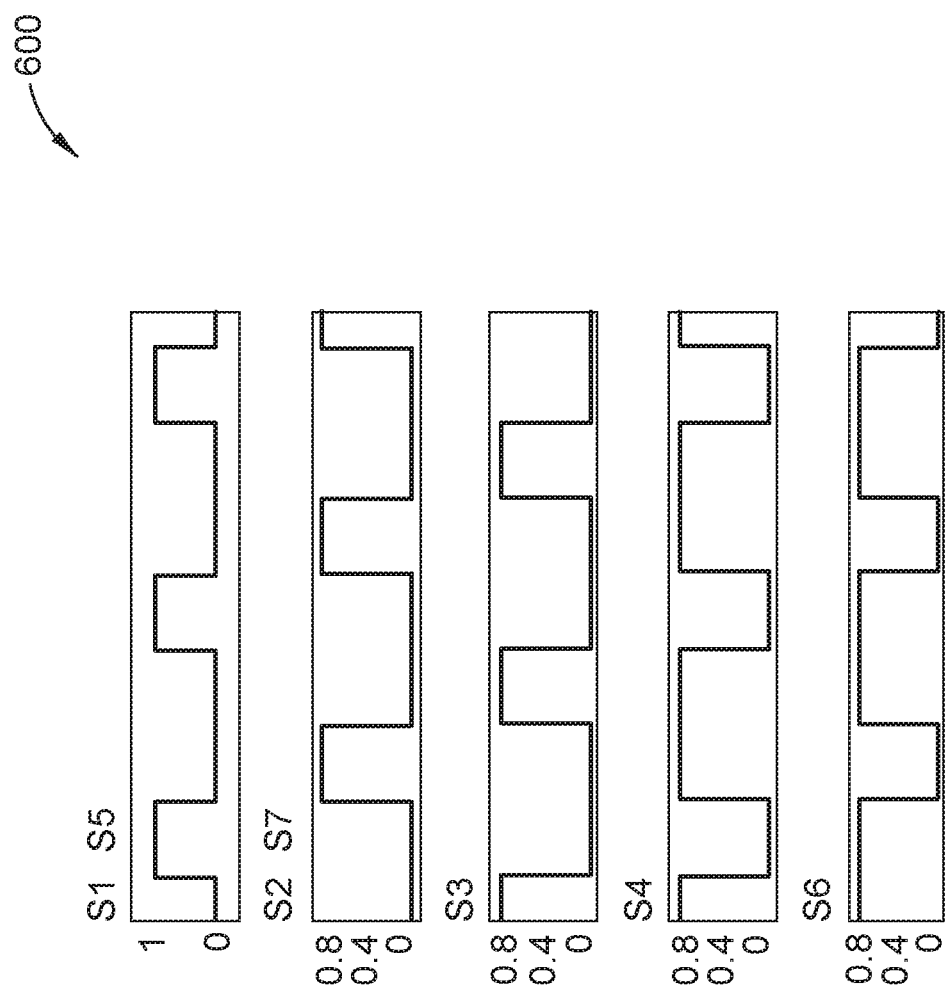
FIG. 6 shows illustrative duty cycles associated with the switches $S_1$, $S_2$, $S_3$, $S_4$, $S_5$, $S_6$, $S_7$ of the system of FIG. 1.

FIG. 5 is a circuit diagram of an embodiment of a system 500 that is similar to the system 300 of FIG. 3, but that switches out the diodes with MOSFETs. The use of the MOSFETs may reduce conduction loss. For each module (e.g., comprising a MOSFET switch and two additional MOSFETs switches) a high side switch $S_2$ and a low side switch $S_7$ may share the same gating signal. The high side switch $S_2$ and the middle side switch $S_6$ may be complementary. FIG. 6 shows illustrative duty cycles 600 associated with the switches $S_1$, $S_2$, $S_3$, $S_4$, $S_5$, $S_6$, $S_7$ of the system 600 of FIG. 1.

Figure 7:
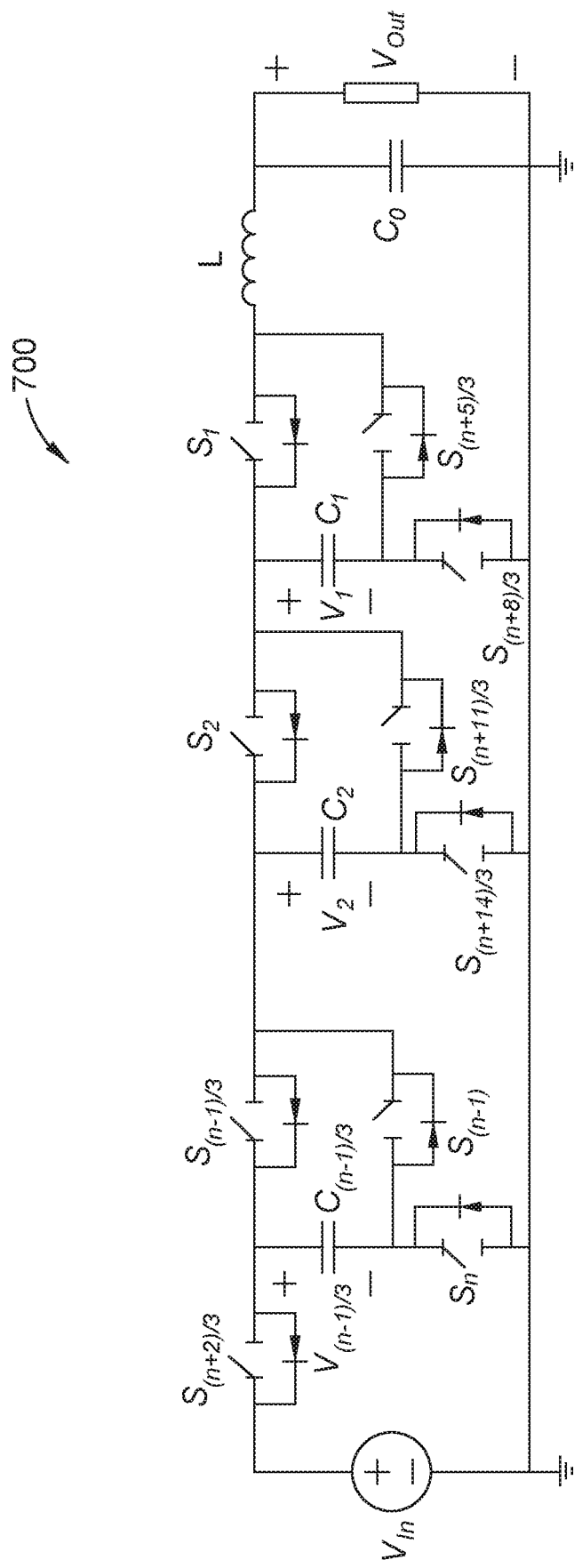
FIG. 7 is a circuit diagram of an embodiment of a system that is similar to the system of FIG. 5, but that also includes an inductor.
Figure 8:
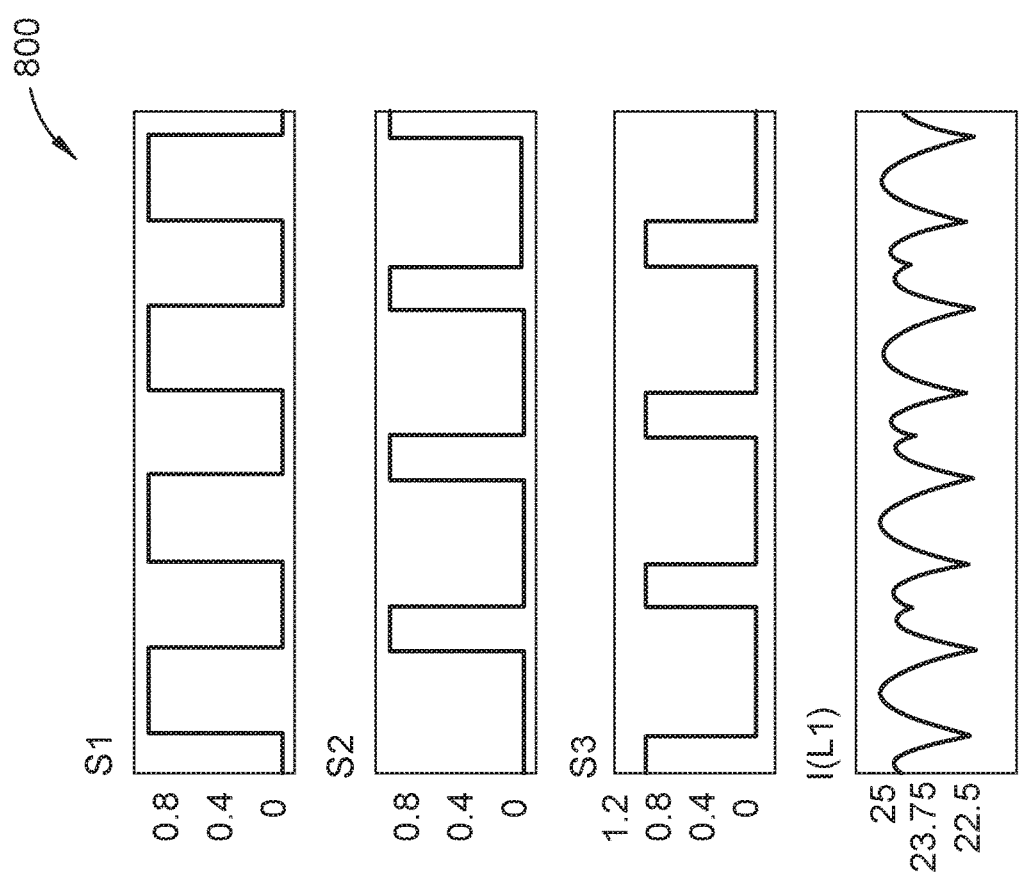
FIG. 8 shows duty cycles associated with the system of FIG. 7.

FIG. 7 is a circuit diagram of an embodiment of a system 700 that is similar to the system 500 of FIG. 5, but that also includes an inductor L. The use of the inductor may allow for different duty cycles, where desired. For instance, $S_1$ may have a fifty percent duty cycle, while the duty cycle of $S_2$ may be closer to thirty percent. Examples of those duty cycles 800 are shown in FIG. 8.

Figure 9:
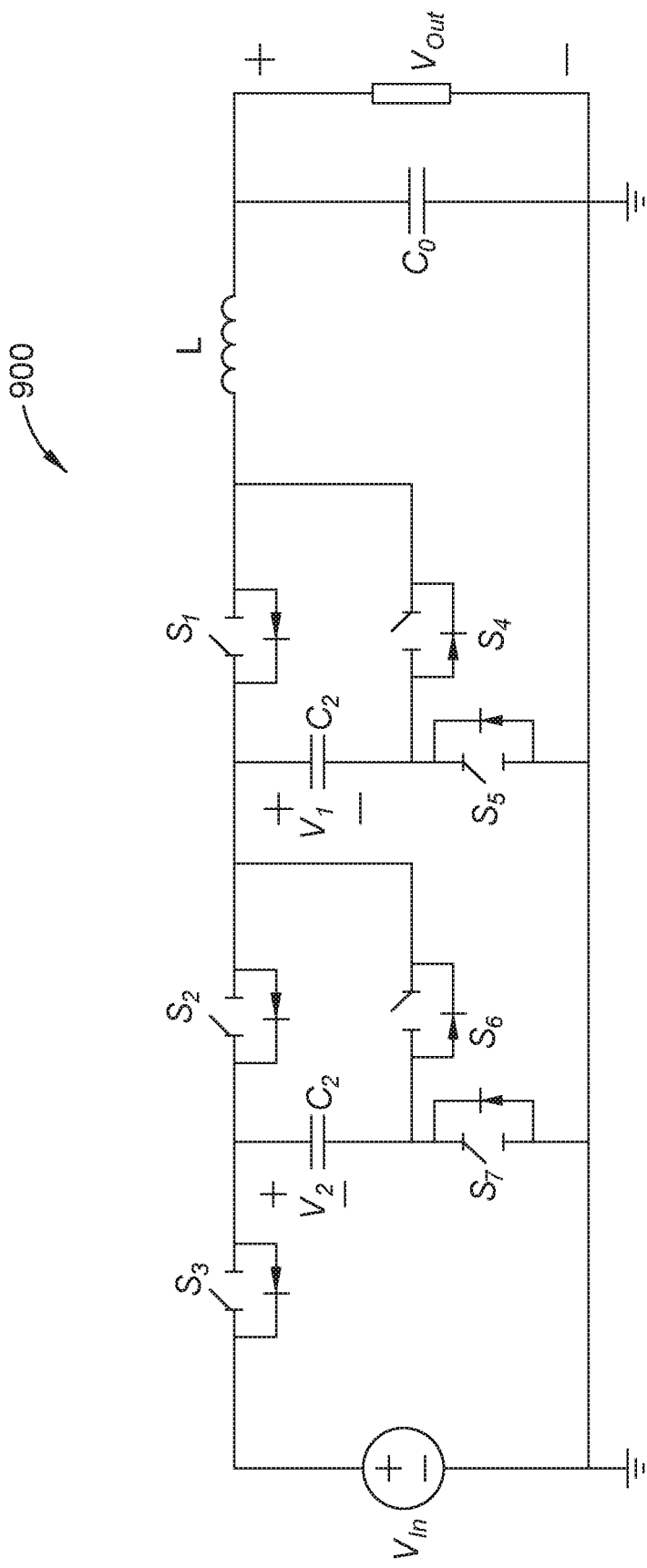
FIG. 9 is a circuit diagram of an embodiment of a system 900 that is similar to the system 700 of FIG. 7, but that includes a smaller inductor.
Figure 10:
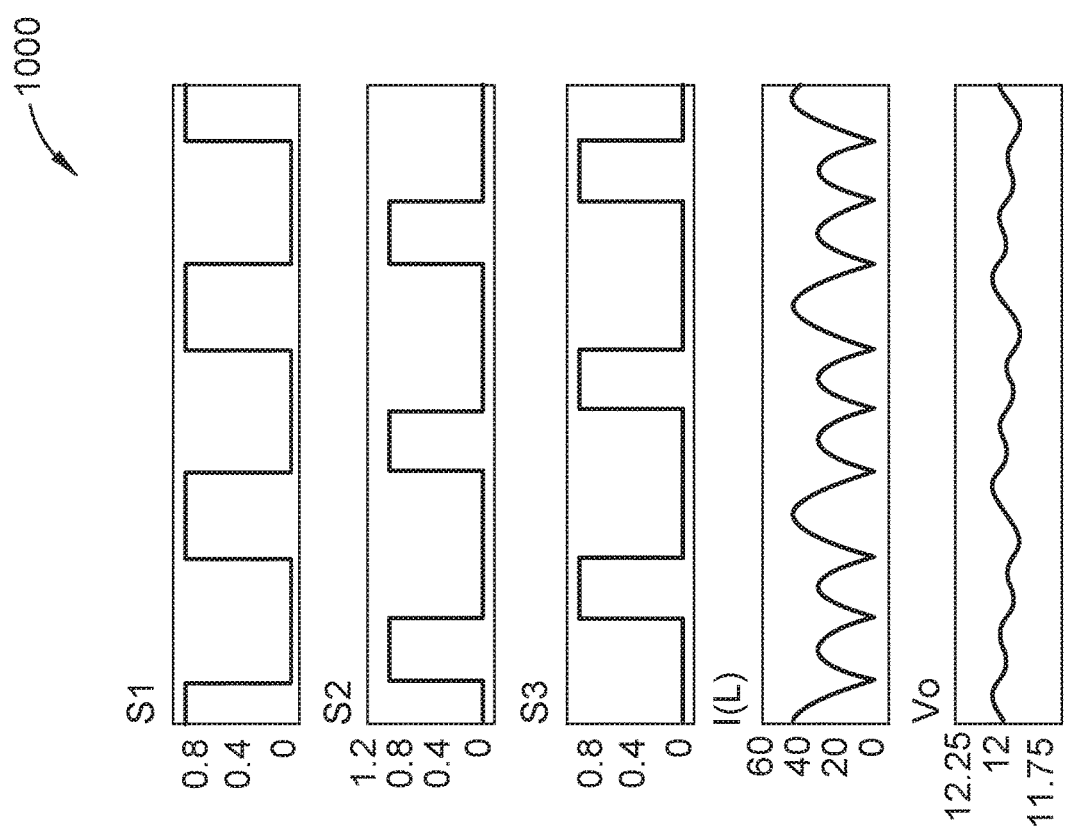
FIG. 10 shows duty cycles associated with the system of FIG. 9.

FIG. 9 is a circuit diagram of an embodiment of a system 900 that is similar to the system 700 of FIG. 7, but that includes a smaller inductor L. For example, the inductor L of the system 900 may be an order of ten smaller than the inductor L of the system 700 of FIG. The smaller inductor may be sized in such a manner as the inductor and capacitance resonate together. The resonating may reduce heat/energy loss and increase efficiency. FIG. 10 shows duty cycles 1000 associated with the system of FIG. 9.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

While the foregoing is directed to embodiments of the present invention, other and further embodiments of the invention may be devised without departing from the basic scope thereof, and the scope thereof is determined by the claims that follow.

What is claimed is:

1. An apparatus comprising:
   first and second switching components, wherein a first end of the first switching component is directly coupled to a first end of the second switching component;
   first and second conductivity arbitrating devices in electrical communication with the first and second switching components, wherein a first end of the first conductivity arbitration device is directly coupled to the first ends of the first and second switching components; and
   driver circuitry configured to deliver a plurality of driver signals to the first and second switching components, wherein the plurality of driver signals include interleaved modulation and a duty cycle configured to step-down a direct current (DC) voltage.

2. The apparatus of claim 1, further comprising a modulator configured to interleave a plurality of duty cycle signals delivered to the driver circuitry.

3. The apparatus of claim 1, wherein the duty cycle changes as a function of a number of switching components and a number of conductivity arbitrating devices.

4. The apparatus of claim 1, further comprising a modulator configured to generate a plurality of duty cycle signals having a duty cycle equal to 1/(nc+1), wherein nc is (n−1)/3, and n is a number of switching components plus a number of conductivity arbitrating devices.

5. The apparatus of claim 1, wherein the first and second conductivity arbitrating devices include at least one of a diode or an additional switch.

6. The apparatus of claim 1, wherein the first and second switching components include a metal-oxide-semiconductor field-effect transistor (MOSFET).

7. The apparatus of claim 1, further comprising an inductor.

8. The apparatus of claim 7, wherein the inductor resonates with a capacitance.

9. The apparatus of claim 1, further comprising a modular cell comprising an additional switching component and two additional conductivity arbitrating devices.

10. The apparatus of claim 1, further comprising a modulator configured to generate a plurality of duty cycle signals having a duty cycle equal to 1/(nc+1), wherein nc is a number of modular cells.

11. The apparatus of claim 1, further comprising:
    a first capacitor with a first end coupled to a second end of the first switching component and a second end coupled to a second end of the first conductivity arbitration device; and
    a second capacitor with a first end coupled to the first ends of the first and second switching components and a second end coupled to a first end of the second conductivity arbitration device, and wherein a second end of the second conductivity arbitration device is coupled to a second end of the second switching component.

12. A method of manufacturing a circuit, the method comprising:
    providing first and second switching components, wherein a first end of the first switching component is directly coupled to a first end of the second switching; and
    providing first and second conductivity arbitrating devices in electrical communication with the first and second switching components, wherein a first end of the first conductivity arbitration device is directly coupled to the first ends of the first and second switching components; and
    providing driver circuitry configured to deliver a plurality of driver signals to the first and second switching components, wherein the plurality of driver signals include interleaved modulation and a duty cycle configured to step-down a direct current (DC) voltage.

13. The method of claim 12, further comprising providing a modulator configured to interleave a plurality of duty cycle signals delivered to the driver circuitry.

14. The method of claim 12, further comprising changing the duty cycle as a function of a number of switching components and a number of conductivity arbitrating devices.

15. The method of claim 12, further comprising providing a modulator configured to generate a plurality of duty cycle signals having a duty cycle equal to 1/(nc+1), wherein nc is (n−1)/3, and n is a number of switching components plus a number of conductivity arbitrating devices.

16. The method of claim 12, wherein the first and second conductivity arbitrating devices include at least one of a diode and an additional switch.

17. The method of claim 12, wherein the first and second switching components include a metal-oxide-semiconductor field-effect transistor (MOSFET).

18. The method of claim 12, further comprising providing an inductor.

19. The method of claim 12, further comprising providing a modular cell comprising an additional switching component and two additional conductivity arbitrating devices.

20. The method of claim 12, further comprising providing a modulator configured to generate a plurality of duty cycle signals having a duty cycle equal to 1/(nc+1), wherein nc is a number of modular cells.

* * * * *